US006054708A

United States Patent [19]

Shimizu

[11] Patent Number: 6,054,708

[45] Date of Patent: Apr. 25, 2000

[54] NEUTRON BEAM CONTROL METHOD AND ITS APPARATUS

[75] Inventor: Hirohiko Shimizu, Saitama, Japan

[73] Assignee: The Institute of Physical and Chemical Research, Japan

[21] Appl. No.: 09/033,720

[22] Filed: Mar. 3, 1998

[30] Foreign Application Priority Data

Mar. 3, 1997 [JP] Japan .................................... 9-048237

[51] Int. Cl.$^{7}$ .............................. G01N 23/00; G01K 1/00

[52] U.S. Cl. ....................... 250/251; 250/505.1; 378/145; 378/147; 378/149

[58] Field of Search ................................ 250/251, 505.1; 378/145, 147, 149; 376/158

[56] References Cited

U.S. PATENT DOCUMENTS

| | | | |
|---|---|---|---|
| 5,744,813 | 4/1998 | Kumakhov | 250/505.1 |
| 5,880,478 | 3/1999 | Bishop et al. | 250/505.1 |

*Primary Examiner*—Edward P. Westin
*Assistant Examiner*—Nikita Wells
*Attorney, Agent, or Firm*—Pennie & Edmonds, LLP

[57] ABSTRACT

The methods and apparatuses for the control of neutron beams are herewith presented. Through the application of the methods and apparatuses presented one can manipulate various characteristics of neutron beams such as shape, velocity, density, polarization and other traits. In general three sequential operations are performed on the neutron beam, although variations of these steps are described to suit various purposes. First, a neutron beam is passed through a gradient magnet field which causes rotation of the beam in phase space. Second, the spin direction of a neutron beam is reversed through the application of a spin flipper. Third, the neutron beam is compressed in the longitudinal direction of the neutron beam in phase space. This produces a neutron beam having small divergence in phase space. The resultant neutron beam corresponds to a thin dense beam in real space. Variations of this paradigm allow for the manipulation of many characteristics of neutron beams to suit ones purpose.

16 Claims, 16 Drawing Sheets

NEUTRON BEAM CONTROL METHOD AND ITS APPARATUS

BACKGROUND OF THE INVENTION

1. FIELD OF THE INVENTION

The present invention relates to methods and apparatuses for controlling the shape, velocity direction, polarization and other characteristics of neutron beams.

2. DESCRIPTION OF PRIOR ART

Neutrons are important probes in material science because of the feature that they can interact with nuclei through strong interactions; their kinetic energy and wavelength are of the same order as atomic motion in matter and the scale of atomic structure, they have a magnetic moment and a strong penetrability, etc. Neutrons provide information of nuclei through nuclear interactions, while X-rays and photons provide information about atom structure through electromagnetic interactions. Therefore, neutron scattering experiments are necessary for the determination of the position and motion of nuclei regardless of the electron clouds of atoms.

The strength of neutron-nuclear interactions are irregular with respect to the atomic number of elements and dependence on the mass number of isotopes, while the strength of electromagnetic interactions have a monotonous dependence only on the atomic number. This feature is applied to distinguish elements which have similar electromagnetic scattering strengths and isotopes of an atomic number. It is also applicable for determining the position and motion of light elements such as the study of hydrogen atoms in organic materials.

The neutron magnetic dipole moment originates from its ½ spin and is suitable for the study of the magnetic structure of matter. The strong penetrability can be applied to investigate the macroscopic structure of bulk samples such as industrial products, which are difficult to investigate using charged particles and X-rays.

The efficient use of neutron beams is very important since neutron beams are available at limited facilities equipped with nuclear reactors, accelerators and strong radioactive sources. Improvement of neutron beam transport from a neutron source to a neutron spectrometer is strongly desired since the improvement of neutron source intensity is limited by both cost and radiation control technique. The improvement not only reduces measurement time but also enables us to carry out in situ measurements of transient phenomena and to study the structure of new materials for which large scale single crystals are not available. It also reduces the risks in radiation safeties.

Neutron guides are commonly used in neutron transport. Neutron beams can be bent according to their reflection on the interface of matters with a sufficiently small incident angle. Neutron guides are vacuum tubes that have an inner surface that is coated with a neutron reflector such as nickel and are pumped to a vacuum to minimize the loss of neutrons through scattering by air. Neutrons incident to the guide with an angle smaller than the critical angle of the neutron reflector material are reflected on the inner surface and transported downstream.

FIG. 17A is an illustration of the concept of neutron scattering and FIG. 17B is an enlarged view around the sample. Neutrons are emitted in all directions from the neutron source 100: nuclear reactors or radioactive sources or nuclear target bombarded by charged particles. A part of the neutrons that are generated are then transported by the neutron guide 101 and incident to the sample 102. A neutron detector, such as a proportional counter 103, measures the intensity of neutrons scattered at an angle of $\theta$. The angular distribution of the scattered neutrons is analyzed to extract information related to the atomic structure of the sample. The typical aperture of the neutron guide 101 is about 5 cm and the typical size of the sample 102 is 1–2 cm or larger.

One of the existing devices that increase beam density are neutron capillary tubes. Neutron capillary tubes are bundled tubes 110 which have thin channels with diameters of about 10 $\mu$m as shown in FIG. 18. Incident neutrons are transported by reflection on the inner surface of the channels. Neutron beam density is improved by adjusting the curvature of each tube 101 so that the exiting neutrons are focused on a small area 113.

The beam divergence of the incident beam should be sufficiently small for good resolution in determining scattering angles since scattering angles cannot be determined precisely if the incident beam is divergent. A is common method to reduce beam divergence is by neutron diffraction. However, beam intensity is attenuated to much upon diffraction.

Dense and thin neutron beams are strongly desired in the analysis of new materials since large samples of 1–2 cm cannot easily be prepared. Small divergence of incident beams are also required to determine the atomic structure of a sample.

Neutron guides can transport neutrons efficiently but cannot focus nor reduce beam divergence. Neutron beams 104 emitted at the exit of neutron guide 101 are divergent. Neutrons with the scattering angles of $\theta_1, \theta_2, \ldots$ are detected by the same detector 103 as shown in FIG. 17B. This causes a non-negligible error in determining the scattering angles. Beam collimators are placed upstream from the sample to reduce the error which suppresses the efficiency the neutron use.

Neutron capillary tubes increase neutron beam density.

However, the efficiency of the neutron use is suppressed, as shown in FIG. 18, because only the neutrons transported through the thin channels are focused downstream and neutrons 112 that pass between tubes 110 are not used. In addition, since the tubes 110 are curved to bring the neutrons into convergence, beam divergence is enlarged at the focal point; this is not suitable for good angular resolution.

Neutron diffraction by a single crystal can suppress neutron beam divergence. However, the beam intensity is attenuated to much.

Existing methods related to neutron beam control are not appropriate for obtaining a thin and dense beam.

SUMMARY OF THE INVENTION

The present invention was made in consideration of the present status of neutron beam control techniques as discussed above. A purpose of the present invention is to provide a method and an apparatus for optimizing the density and divergence of neutron beams according to the requirements of the measurements. We also aim to provide a method and an apparatus for controlling the shape and velocity direction of neutron beams. Moreover, we aim to provide a method and an apparatus for obtaining polarized neutron beams with the above-mentioned favorable beam characteristics and to provide a new method and apparatus for the analysis of neutron polarization.

Although they have no electric charge, neutrons are accelerated along magnetic field gradients through the dipole interaction between the neutron's magnetic dipole moment and an external magnetic field.

Neutron spin precesses about the external field direction at an angular frequency of $\omega_L=\gamma B$ (Larmor precession), where $\gamma$ is the gyromagnetic ratio of the neutron and B is the external magnetic field. In the case where a neutron travels in an inhomogeneous magnetic field, the magnetic field direction seen from the neutron rest frame rotates at an angular frequency given as Eq. 1.

$$\omega_B = \dot{s}\left|\frac{\partial \hat{B}}{\partial s}\right| \tag{1}$$

where $\hat{B}=B/|B|$, s is the coordinate taken along the neutron trajectory and the dot denotes the time differential. Neutron spin components which are parallel to the magnetic field follows the rotation of the magnetic field as long as $\Gamma=\omega_L/\omega_B>>1$, which is referred to as the adiabatic condition.

We consider the case that unpolarized neutrons are incident to an inhomogeneous magnetic field. We assume neutron spin is quantized on the entry to the magnetic field and separated into spin components which are parallel and antiparallel to the magnetic field with an equal probability. We assume that the adiabatic condition is satisfied on every neutron trajectory and therefore the relative sign of neutron spin about the magnetic field direction is conserved. Under these condition, the equation of motion is simplified as Eq. 2

$$\ddot{r} = \mp\alpha\nabla|B| \tag{2}$$

where r is the neutron position, m is the neutron mass, $\alpha=\mu/m$ and $\mu$ is the neutron magnetic dipole moment. ± signs correspond to spin-parallel and spin-antiparallel components, respectively.

We consider the case that the external field can be expressed as Eq. 3 in Cartesian coordinates as shown in FIG. 1.

$$B = \begin{pmatrix} 0 \\ ax^2 + B_0 \\ 0 \end{pmatrix} \tag{3}$$

$B_0$ is a constant field that is added so that the adiabatic condition ($\Gamma>>1$) is satisfied at any place and $\alpha>0$. Eq. 3 can be written as Eq. 4.

$$\ddot{x} = \mp\omega^2 x \tag{4}$$

by putting $\omega^2=2\alpha\alpha$. We define a variable $\xi$ by Eq. 5.

$$\xi = \frac{\dot{x}}{\omega} \tag{5}$$

Eq. 6 is the solution written as a linear transformation in phase space (X $\xi$-space).

$$\begin{pmatrix} x \\ \xi \end{pmatrix} = L_{P,A}\begin{pmatrix} x_0 \\ \xi_0 \end{pmatrix} \tag{6}$$

with $$L_P = \begin{pmatrix} \cos\theta & \sin\theta \\ -\sin\theta & \cos\theta \end{pmatrix} \tag{7}$$

$$L_A = \begin{pmatrix} \cosh\theta & \sinh\theta \\ \sinh\theta & \cosh\theta \end{pmatrix}$$

$L_P$ and $L_A$ correspond to spin-parallel and spin-antiparallel components, respectively. $x_0$ and $\xi_0$ are initial values of x and $\xi$ and $\theta=\omega t$.

The area on x $\xi$-space is conserved by both $L_P$ and $L_A$,consistent with Liouvilles's theorem. FIGS. 2A and 2B show the transformation on the x $\xi$-plane. $L_P$ rotates the spin-parallel component by an angle of $-\theta$ on x $\xi$-space as shown in FIG. 2A and can be used as a convex lense in real space. $L_A$ magnifies the spin-antiparallel component by $\exp(\theta)$ and $\exp(-\theta)$ along (1,1)-direction and (−1,1)-direction on x $\xi$-space as shown in FIG. 2B, and can be used as a concave lens in real space. Neutron transport without magnetic field gradients can be described by the linear transformation on x $\xi$-space through the matrix given in Eq. 8.

$$L_0 = \begin{pmatrix} 1 & \theta \\ 0 & 1 \end{pmatrix} \tag{8}$$

Neutron beam focus and beam divergence control can be achieved by using the transformations described above. For example, we consider the case that the unpolarized parallel neutron beam propagating with the velocity $V_z$ along the beam axis 10 is incident to the magnet 11 of the length of $1_1$ whose field is given by Eq. 3. The fringing field of the magnet 11 is assumed to be adiabatically connected to a flat field. The neutron beam is focused downstream of the exit of the magnet 11 by the distance $1_2$, where $$\omega l_2 / v_z = \cot(\omega l_1 / v_z) \tag{9}$$

Focused neutrons are polarized parallel to the magnetic field (the anti-parallel component is swept off the beam axis).

The present invention was made based on the above mentioned transformation through the magnetic interaction between the neutron magnetic moment and magnetic field gradients. It is characterized by the control of neutron distribution in phase space by the magnetic field gradient, thereby controlling the shape and velocity direction of neutron beams in real space.

More specifically, the method of the invention is characterized by changing neutron beam distributions to desired ones by using transformations in phase space upon traveling through inhomogeneous magnetic fields of appropriate distances. Here, the beam distribution in phase space means the distribution in multi-dimensional space comprising spatial coordinates and the corresponding velocity components. Even if the shapes of two neutron beams are identical in real space, they should be regarded as having different shapes as long as they have different distribution in velocity space.

First of all, spatial coordinates and velocity coordinates can be interchanged by applying a convex lens function which rotates the neutron beam in phase space. Thin beams defined by collimators can be transformed into parallel beams. This function is not available through conventional neutron beam control techniques.

Next, neutron beams can be expanded and compressed in phase space by applying a concave lens function. Combinations of convex and concave functions can be applied for the optimization of beam shape in phase space. For example, thin and divergent beam can be converted to less divergent beams by successive transformations of convex and concave functions so that the convex function rotates the original ξ-axis to be parallel to (−1,1) direction and the concave function compresses the beam.

The combination of convex and concave functions can be achieved by arranging three steps sequentially: the convex function step, the step in which the sign of neutron spin relative to the magnetic field is reversed and the concave function step.

Inhomogeneous magnetic fields can be categorized into even-function-like and odd-function-like cases. Magnetic fields which changes with the same sign as those coming off the beam axis correspond with the even-function-like case, while those that change with the opposite sign correspond with the odd-function-like case. These cases can be selectively applied according to the purpose of beam control. Generally speaking, the even-function-like case provides transformations corresponding to a convex lens function and the odd-function-like case provides transformations corresponding to a concave lens function. Analytical solution of the equation of motion can be obtained as exact rotation and expansion-compression in the case of a sextupole field whose magnetic field strength is proportional to the square of the distance from the magnet axis. The equation of motion is a nonlinear equation for higher order fields and we have not found analytical solutions for those cases. Qualitatively speaking, such higher order even-function-like fields cause a differential rotation and a non-linear expansion-compression in phase space. Odd-function-like fields bend neutron trajectory. In the case of a quadrupole field, analytical solutions can be obtained and neutrons are bent along a parabolic trajectory, along the direction of the magnetic field gradient. Qualitatively, higher order odd-function-like fields bend neutron trajectory.

Each neutron is polarized with respect to the local magnetic field after transmission through inhomogeneous magnetic fields. Thus, a polarized neutron beam is obtained in the case where the inhomogeneous magnetic field is adiabatically connected to a flat field. Incident neutrons can be selectively bent according to the spin direction at the entrance of the inhomogeneous magnetic field.

A neutron beam control apparatus of the present invention comprises a generator of inhomogeneous magnetic fields, a spin flipper which is a device to reverse the sign of neutron spin about the local field and another generator of inhomogeneous magnetic fields. The apparatus is characterized by, (1) the function of the first magnet which rotates the incident beam in phase space and focuses it in real space and (2) the function of the second magnet which compresses the incident beam along its longer side and outputs a beam of small divergence. More than one set of the above components can be applied for neutron beam control.

Also, the neutron beam control apparatus of the present invention comprises a generator of an inhomogeneous magnetic field which interchanges spatial coordinates with velocity coordinates through rotation in phase space. The generator of an inhomogeneous magnetic field may be a sextupole magnet.

The neutron beam control apparatus of the present invention comprises a generator of an inhomogeneous magnetic field whose gradient has a fixed sign along a direction normal to the beam axis, where the generator has a function of bending the neutron trajectory.

Moreover, the polarizing and neutron spin analysis functions are provided by adiabatically connecting the local magnetic field to a flat magnetic field.

BRIEF DESCRIPTION OF DRAWING

FIG. 2A is a view showing the motion of neutron beams whose spin are parallel to the magnetic field, and FIG. 2B is a view showing the motion of neutron beams whose spin are antiparallel to the magnetic field.

FIG. 4A is a general view of the apparatus, and FIG. 4B is a cross-sectional view taken along the lines of A—A of FIG. 4A.

FIG. 9A is a schematic view of neutron beams emitted from the rod-like neutron source, and FIG. 9B is a view showing the motion of neutron beams in phase space.

FIG. 17A is a general view, and FIG. 17B is an enlarged view of a portion close to a sample.

DESCRIPTION OF THE PREFERRED EMBODIMENTS

The following will explain the embodiments of the present invention with reference to the drawings.

Figure 1:
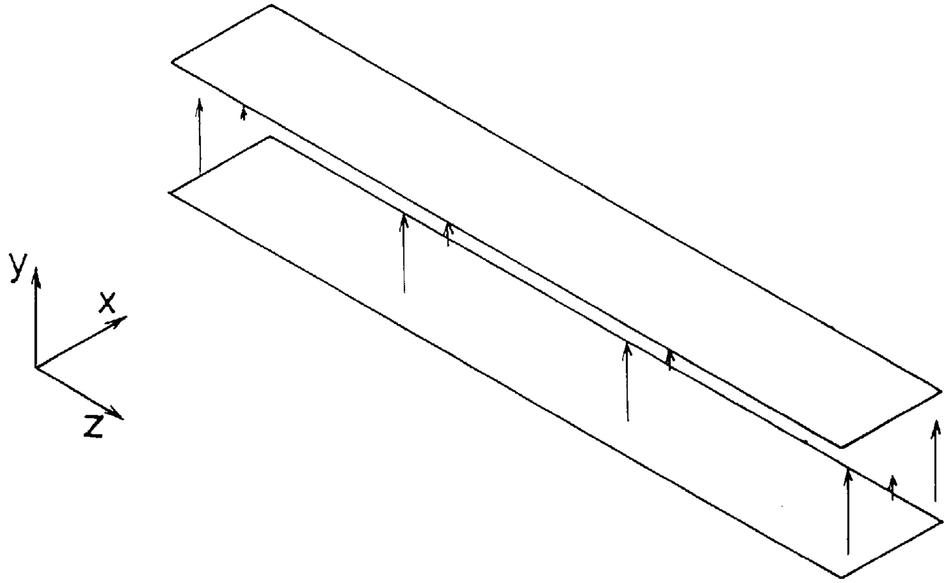
FIG. 1 is a view showing an example of a magnetic field gradient.
Figure 2A:
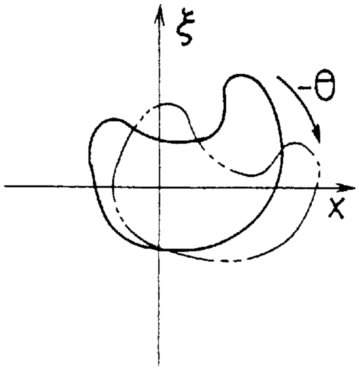
FIGS. 2A to 2B are views showing the motion of neutron beams in phase space.
Figure 2B:
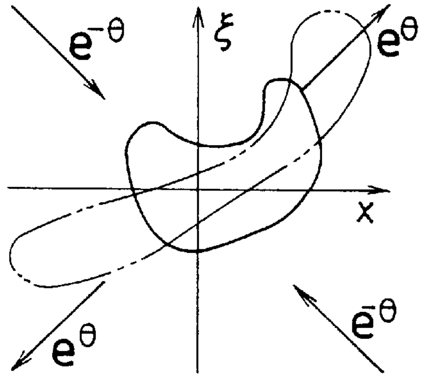
Figure 3:
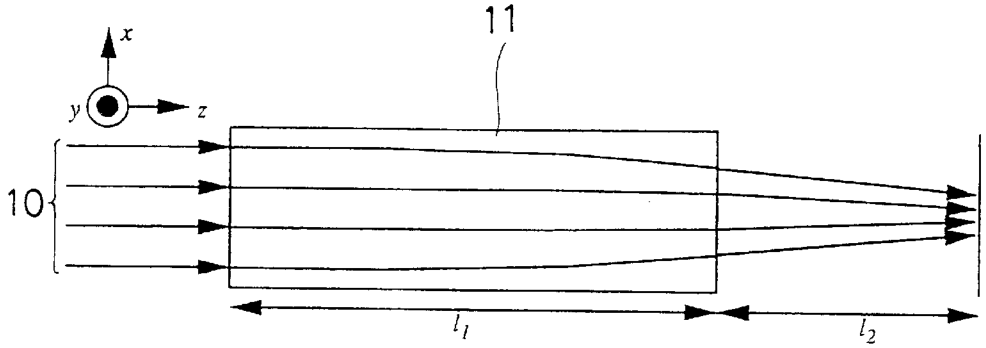
FIG. 3 is a view explaining convergence of unpolarized neutron beams with velocity $V_Z$ along the beam axial direction.
Figure 4A:
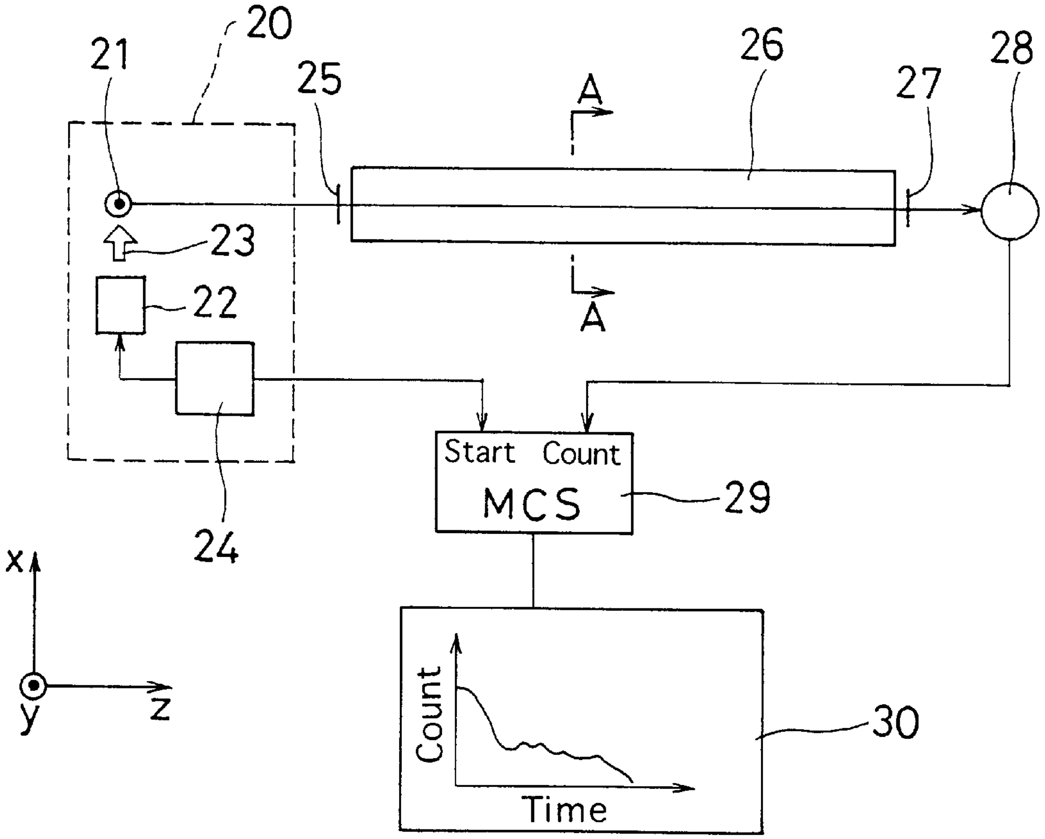
FIGS. 4A and 4B show examples of the neutron beam controlling apparatus of the present invention.
Figure 4B:
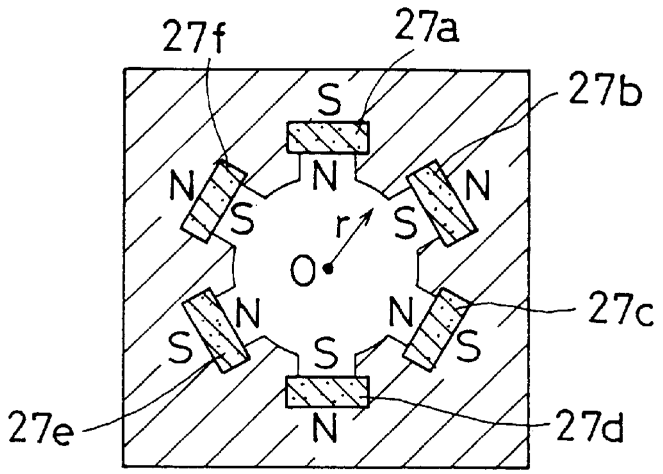

FIGS. 4A and 4B show one embodiment of the neutron beam controlling apparatus. FIG. 4A is a general view of the apparatus, and FIG. 4B is a cross-sectional view taken along line A—A of FIG. 4A. Neutron beams generated from a neutron source 20 are defined by an entrance collimator 25 and incident to a sextupole magnetic field generator 26. The neutron beam passes through the sextupole magnetic field generator 26, is incident to a neutron counter 28 and exits through a collimator 27. As shown by the cross-sectional view of FIG. 4B, the sextupole magnetic field generator 26 is comprised of six magnets 27*a* to 27*f*. These magnets are arranged axially symmetric to a central axis 0 in a longitudinal direction, and their polarities are alternately reversed. The magnetic strength B(r) at a distance r from the central axis 0 on an x-y plane can be expressed by Eq. 10 where c is a constant. Magnets 27*a* to 27*f* may be permanent magnets or electromagnets.

$$B(r)=cr^2 \tag{10}$$

In the case of the sextupole field whose magnetic field strength increases proportionally to the square of the distance from the central axis 0 as coming off the central axis, the sextupole field has the following two functions. One, neutrons having a spin-parallel component are focused onto the axis where the field strength is small. Two, neutrons having a spin-antiparallel component are swept away from the axis where the field strength is strong.

The performance of the neutron beam convergence device was verified based on the following conditions. A neutron production target 21 comprised of lead and tungsten was irradiated with a pulsed electron beam 23 with an energy of 45 MeV from an electron accelerator 22. Then, neutrons were emitted from the target 21. The width of the electron beam pulse was 3 $\mu$s and the repetition frequency was 25 Hz. The field of the sextupole magnetic field generator 26 corresponded to $\omega=4.8\times10^2$ [$s^{-1}$] and the length along the z-direction was set to 2 m. The entrance collimator 25 was of a circular shape with a diameter of 2 mm, and the exit slit 27 was of a circular shape with a diameter of 5 mm. The neutron counter 28 was a $^3$He proportional counter. For comparison a dummy device was prepared 26 which had the same structure and materials as the sextupole magnetic field generator 26 with non-magnetized magnet pieces.

The control signal of the controller 24 and the output of the neutron counter 28 were supplied to a multi-channel scalar (MCS) 29. The timing pulse of the incident electron beam started the MCS, and the neutron signals were counted against the time of flight of neutrons. The output of the multi-channel scalar 29 was supplied to the device 30 which displayed the time-of-flight spectrum in which the horizontal axis displayed time from the start and the vertical axis displayed the neutron count. The time from the start corresponds to the inverse of the velocity of the neutron detected by the neutron counter 28.

Figure 5:
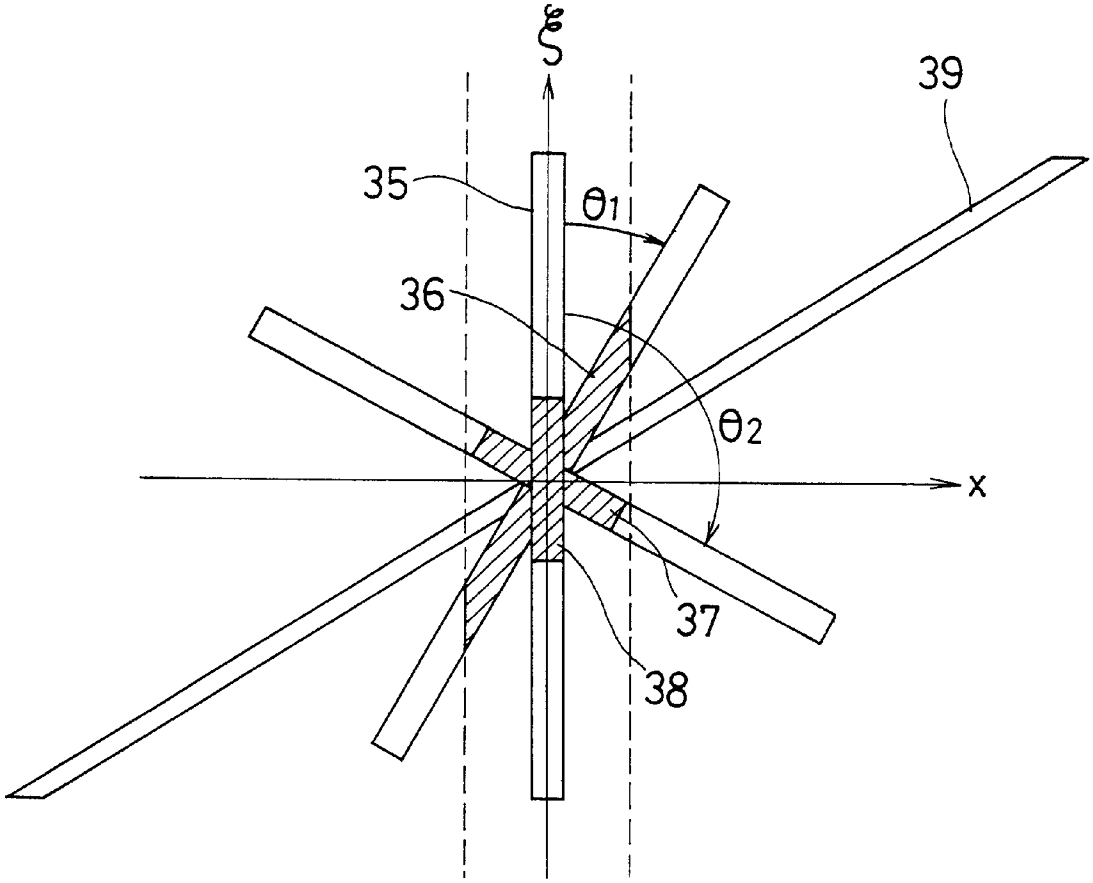
FIG. 5 is a view showing motion of neutron beams in phase space.

The neutron beam passing through the collimator with the diameter of 2 mm is given by rectangle 35 of FIG. 5 in phase space. The same type of equation is satisfied with respect to the y-axis direction. The one dimensional case is discussed for the sake of simplicity. By passing through the magnetic field, the component which is spin-parallel to the local magnetic field, is subjected to the function of $L_P$ of Eq. 7 and is rotated in phase space. In FIG. 5, broken lines show an aperture of the magnet. When the neutrons exceed the aperture of the magnet they are scattered by the magnet. Here, for simplicity, we assume that the neutrons are lost upon scattering. As shown in FIG. 5, after a rotation of $\theta_1$, the neutrons, after passing through the magnet, are shown by an oblique line 36. Similarly in FIG. 5, after a rotation of $\theta_2$, the neutrons, after passing through the magnet are shown by an oblique line 37.

Therefore, the focusing condition is given by $\theta=\pi$, under which the neutron beam is transformed as shown by an oblique line 38 in FIG. 5. On the other hand, if there is no magnetic field when $\theta=\pi$, the neutron beams are transformed as shown by the parallelogram 39 in FIG. 5. Thus, numbers of neutrons are transported along the axis of the magnet through the influence of the magnetic field, and the neutron beam is brought into convergence at the exit of the magnet.

The focusing condition for a magnet length of 2 m corresponds to $\lambda=13$ Å, when $\lambda$ is the neutron wavelength. More specifically, v=300 [$ms^{-1}$] can be obtained by substituting $\theta=\pi, \omega=4.8\times10^2$ [$s^{-1}$] into $\theta=\omega t=\omega\cdot 1/v$, where the length of the magnetic field is 1, and the velocity of the neutron is v. Therefore, $\lambda=13$ Å can be obtained from the relation $\lambda\cdot v=3956$ Å $ms^{-1}$.

Figure 6:
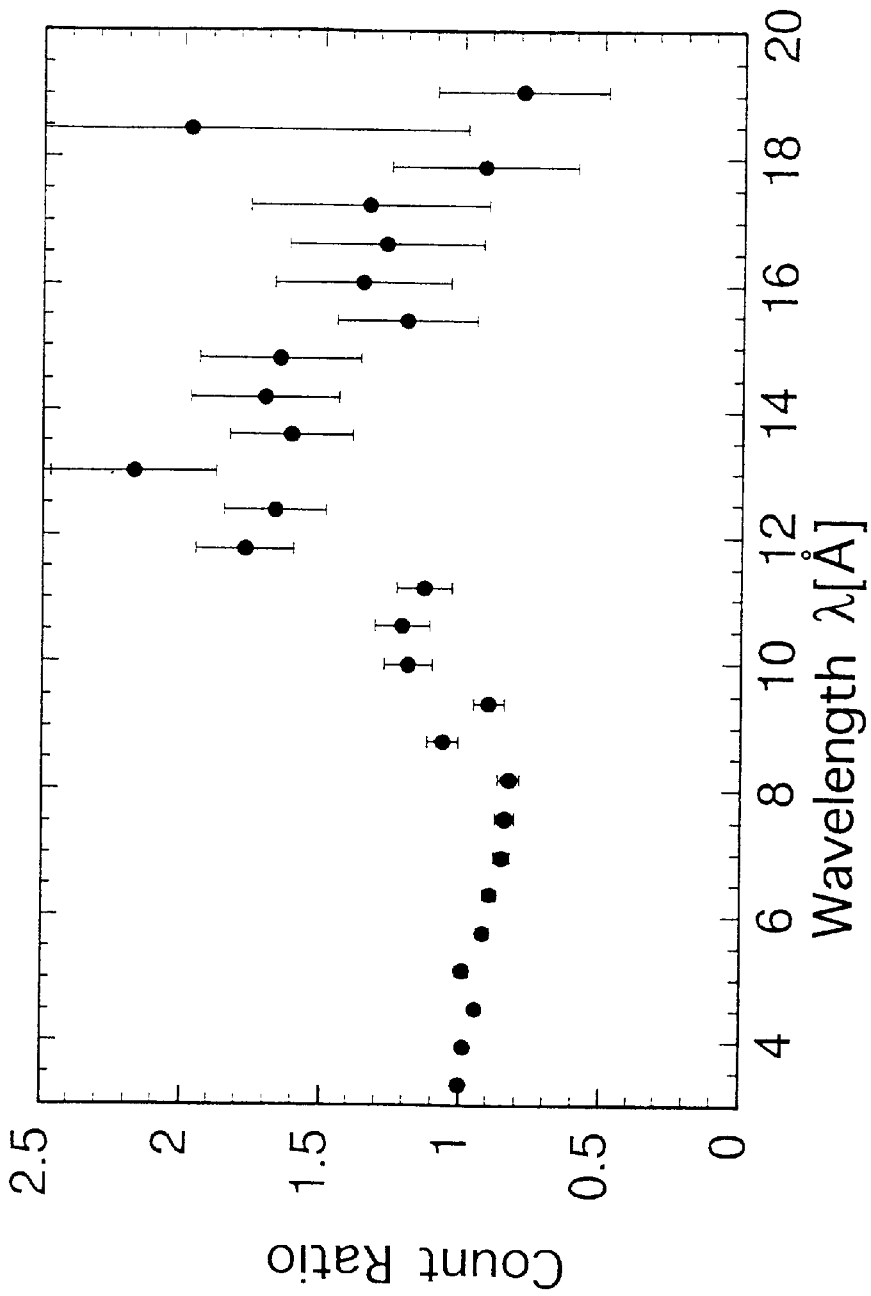
FIG. 6 is a view showing the relationship between neutron energy (wavelength) and an increase ratio of neutron density due to a sextupole magnetic field.

FIG. 6 is a plot of the experimental value of the neutron count transmitted through the sextupole magnet normalized to those transmitted through the dummy device, as a function of neutron wavelength. At the exit of the magnet, as is seen from the figure, amplification of neutron strength is observed at neutron wavelength 13 Å where convergence is expected.

Figure 7:
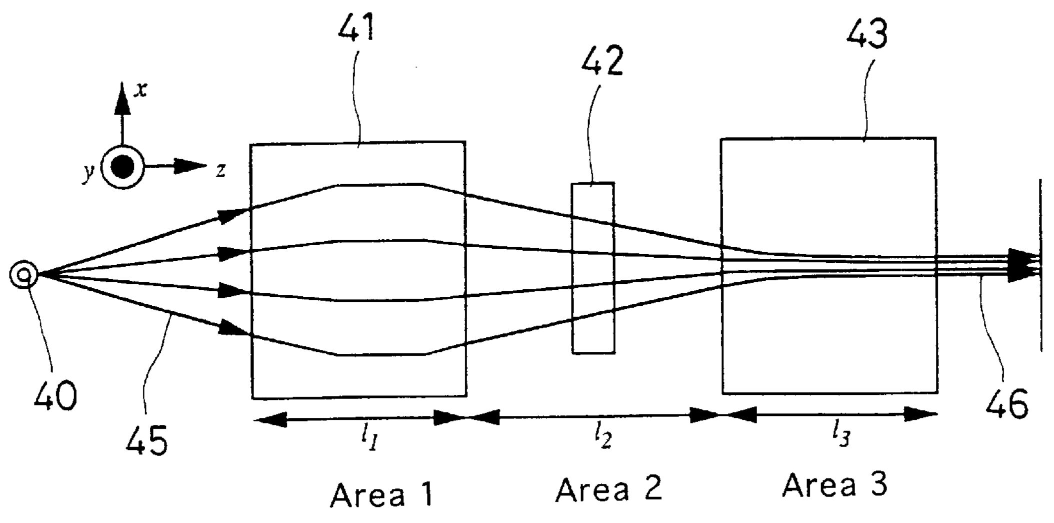
FIG. 7 is a view showing another example of the neutron beam controlling apparatus of the present invention.

FIG. 7 is a view showing another example of the neutron beam controlling apparatus of the present invention. This neutron beam controlling apparatus can be used to transform a neutron beam emitted from a point neutron source into a thin neutron beam having small divergence.

This neutron beam controlling apparatus is comprised of areas one, two and three. Sextupole magnetic field generators 41 and 43, which have the same structure, are arranged in areas one and three, respectively. The sextupole magnetic field generators 41 and 43 have the same structure as explained in FIG. 4. A flat magnetic field is applied to area two, and a neutron spin flipper 42 is provided therein. The field strength is set to satisfy $\Gamma>>1$ for all points of the trajectory of the neutron except the neutron spin flipper 42. The spin flipper used here provides the neutron beam trajectory with an area where the magnetic field radically changes so as to satisfy $\Gamma<<1$ so that the field direction is set to be reserved at the beginning and end of the area, and the relative relationship between the neutron spin and the magnetic field is reversed. Because $\Gamma<<1$, the neutron enters the reversed magnetic field before its spatial direction has changed, thereafter the direction of the spin is maintained by the reversed magnetic field. As a result, the relative parallel and antiparallel relationship between the neutron spin and the magnetic field is reversed. The area of $\Gamma<<1$ can be realized by confining the magnetic fields of opposite polarities into an area as small as possible. More specifically, this can be realized by providing a current sheet, or dividing both magnetic fields by a superconductor sheet to use the Meissner effect therefor.

Figure 8:
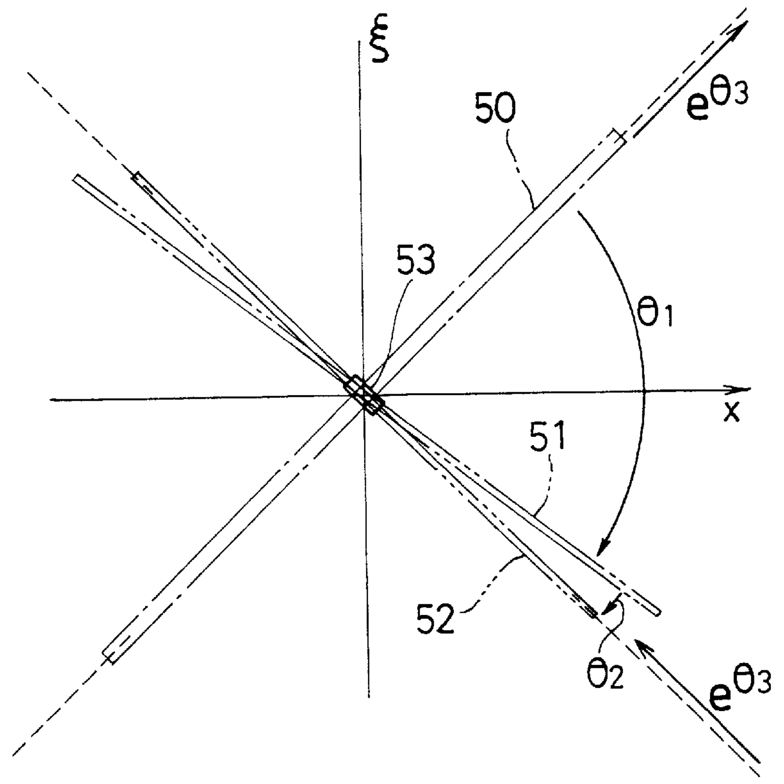
FIG. 8 is a view explaining the function of the neutron beam controlling apparatus of FIG. 7 in phase space.

FIG. 8 is a view explaining the function of the neutron beam controlling apparatus of FIG. 7 in phase space. Neutron beams 45 emitted from a point neutron source 40 have a positive gradient on phase space (x $\xi$ space), and are shown by a line segment 50 passing through an origin. The sextupole magnetic field generator 41 of area 1 functions as $L_P$ of Eq. 7 at the entrance of area 1 with respect to the neutrons whose spin are parallel to the magnetic field, and functions as $L_A$ of Eq. 7 with respect to the neutrons whose spin are antiparallel to the magnetic field. Therefore, half of the neutrons (spin-parallel to the magnetic field) are transported to the exit side of area 1, and the other half (spin-antiparallel to the magnetic field) deviate from the center of the sextupole magnetic field generator and diverge.

The incident beam 50 is rotated by $\theta_1$ in area 1 so as to be transformed to a line segment 51. Next, the neutrons enter area 2 and pass through the spin flipper 42. Then, the spin direction relative to the magnetic field is reversed, thereafter the line segment 51 is transformed to line segment 52. A length $l_1$ of area 1 and a length $l_2$ of area 2 are determined such that the line segment 52 is oriented to a direction (−1, 1) on the ξ plane. The neutrons whose spin direction are antiparallel to the magnet field are incident to the sextupole magnetic field generator 43 of area 3 through area 2. In area 3, the neutrons are subjected to the function of $L_A$ of Eq. 7, and $L_A$ magnifies the neutrons by exp ($\theta_3$) along (1, 1)-direction and exp ($-\theta_3$) along (−1, 1) on the ξ plane. As a result, the neutron beam that passes through area 3 is compressed to the small-sized line segment 53 in phase space. Thereby, neutron beams can be obtained whose sizes are reduced both in spatial and velocity space (FIG. 7). The resulting neutron beams 46 are polarized about the local magnetic field, and the local magnetic field is adiabatically connected to the flat magnetic field, thereby producing polarized beams.

Figure 9A:
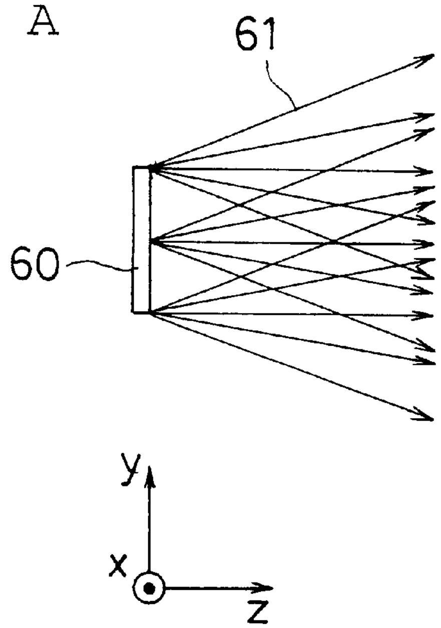
FIGS. 9A and 9B are views explaining control of neutrons emitted from a rod-like neutron source in phase space.
Figure 9B:
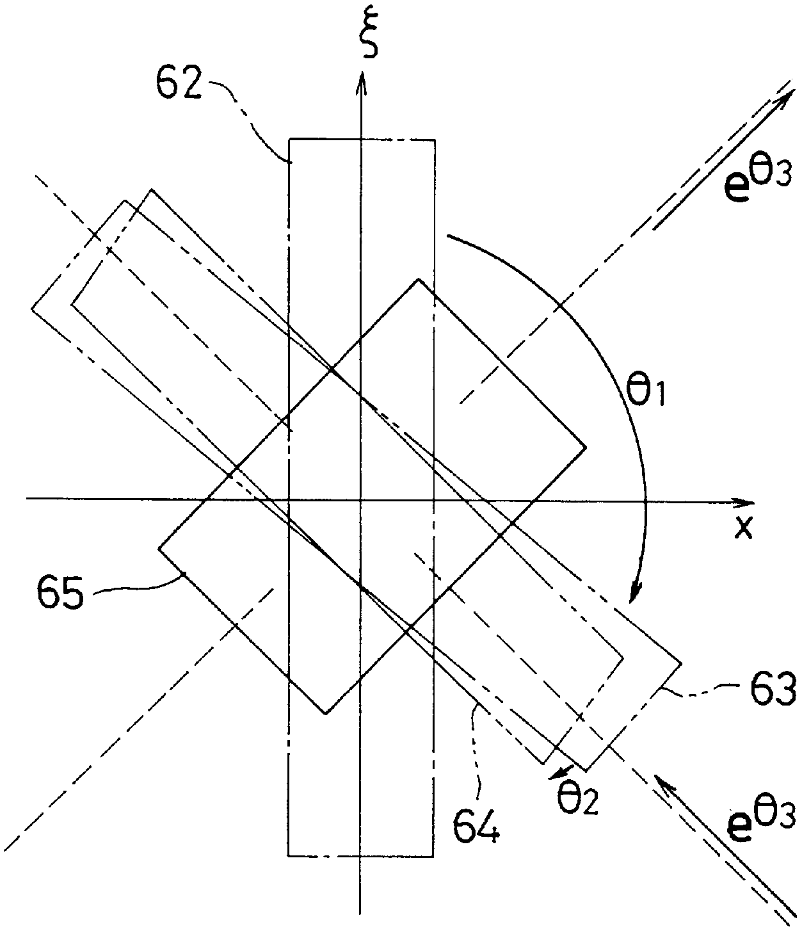

FIGS. 9A to 9B are views explaining the control of neutron beams in phase space when the neutron source of FIG. 7 is not a point source but a source which is belt-shaped in phase space to have a fixed beam divergence regardless of the position of the beam cross section. This corresponds to the ease of transport of the neutron beam by the neutron guide. FIG. 9A shows schematically a neutron beam 61 emitted in the z-direction from such a neutron source 60 that is described above. In phase space, the neutron beam 61 is shown as a belt 62 whose size in the x-direction shown in FIG. 9B is reduced in phase space.

The sextupole magnetic field generator 41 of area 1 functions as $L_P$ of Eq. 7 for neutrons spin-parallel to the magnetic field at the entrance of area 1, and functions as $L_A$ of Eq. 7 for the neutrons spin antiparallel to the magnetic field. Therefore, among the neutrons incident to area 1, the spin-parallel neutrons are transported to the exit side of area 1. However, the spin-antiparallel neutrons are swept away from the center of the sextupole magnetic.

The neutron beam is rotated by $\theta_1$ in phase space while passing the gradient of area 1 so as to be transformed to a belt 63. Sequentially, the neutron beam enters area 2, and passes through the spin flipper 42 so as to be transformed to a belt 64 after the relative relationship between the spin and the magnetic field is reversed. The neutron beam whose spin-direction is antiparallel to the magnet field is incident to the sextupole magnetic field of area 3. In area 3, the neutron beam is subjected to the function of $L_A$ of Eq. 7, and $L_A$ magnifies the neutron beam by exp ($\theta_3$) along (1, 1)-direction and exp ($-\theta_3$) along (−1, 1) in the x ξ space. The neutron beam is transformed to a belt 65 in area 3 with appropriate magnetic strength and length $l_3$ of area 3. At this time, the neutron beam is polarized to the local magnetic field, and the local magnetic field is adiabatically connected to the flat magnetic field, thereby producing the polarized beam.

Figure 10:
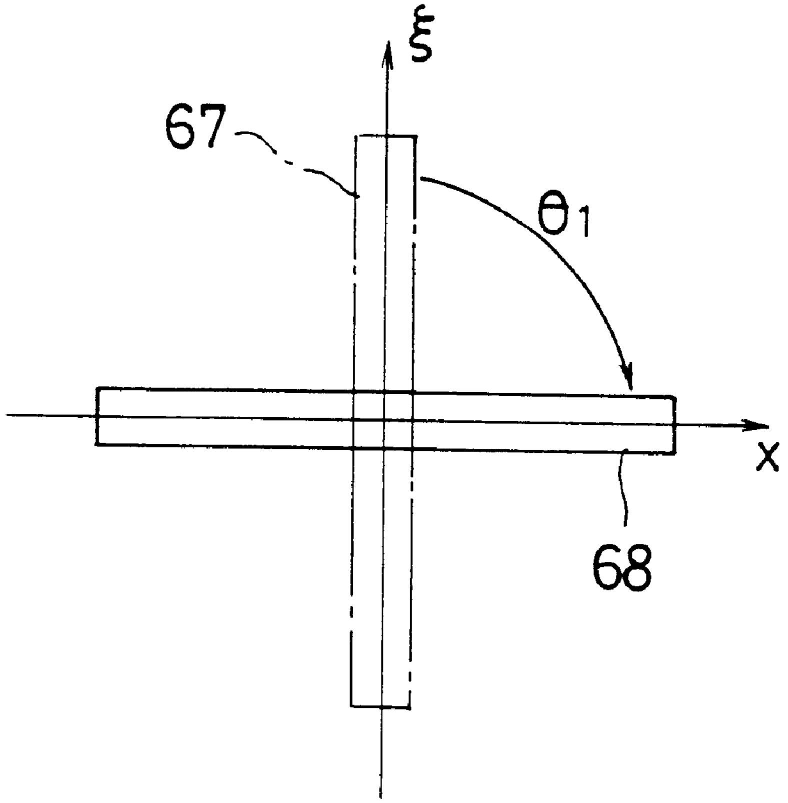
FIG. 10 is a view explaining another example of controlling neutron beams in phase space.

Explained above is the case in which the beam shape is controlled to be symmetric to the central axis. Neutron beams having a wider variety of characteristics, generally speaking, can be obtained. For example, a neutron beam can pass through a sufficiently thin collimator arranged at a position close to x=0 in real space, thereby producing the incident beam 67 distributed on a ξ-axis in phase space as shown in FIG. 10. Thereafter, if the incident beam 67 is rotated by θ=90° by the function of $L_P$ of Eq. 7, the neutron beam 68 having small beam divergence is obtained. Also, if neutron beams with various divergences come from a sufficiently small sample or a slit, and is incident to $L_p$, the neutron beam is separated in real space. This device, which selects an angle formed by the central axis of the magnet and the velocity of the neutron beam, was not previously available. Also, this device can be applied to improve the accuracy of the measurements of scattering angles, particularly small scattering angles.

Figure 11A:
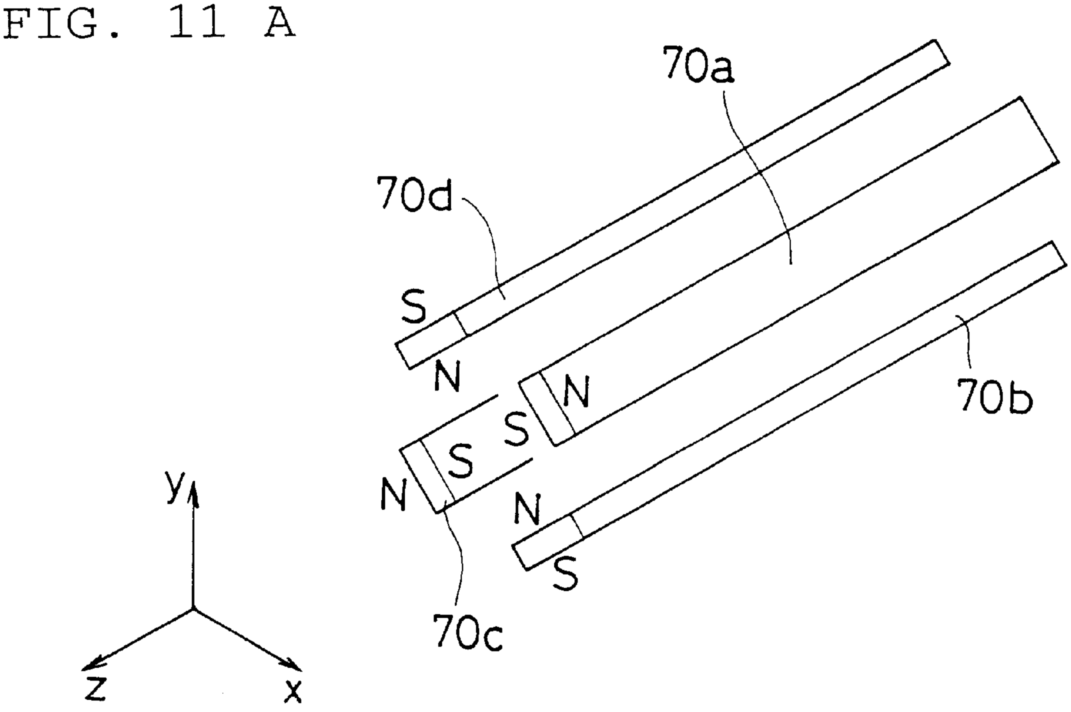
FIGS. 11A and 11B are views showing another example of the neutron beam controlling apparatus of the present invention.
Figure 11B:
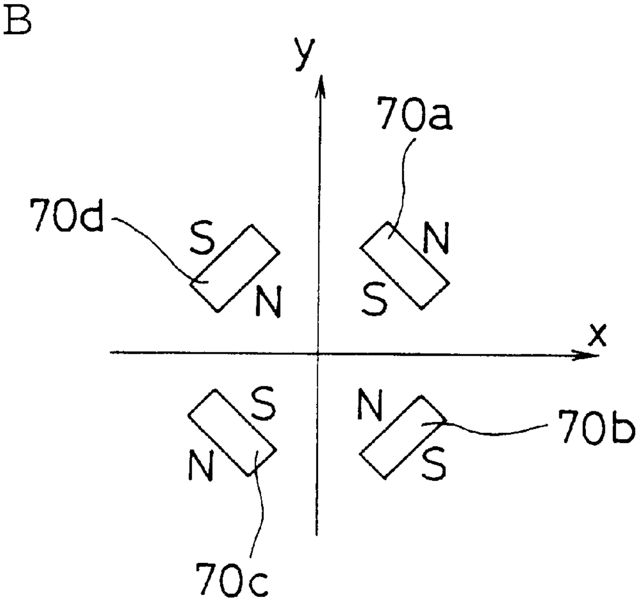

FIGS. 11A and to 11B are views showing another example of the neutron beam controlling apparatus of the present invention, FIG. 11A is a perspective view, and FIG. 11B is a view seen from the x-y plane. This neutron beam controlling apparatus employs a quadruple magnetic field, and can be used to bend neutron beams. The neutron beam controlling apparatus has four magnets 70*a* to 70*d*. These magnets are arranged axially symmetric about the central axis (z-axis), and their polarities are alternately reversed. Field strength $B_x$, $B_y$ in the x-y plane can be expressed by Eq. 11 where c is a constant. The magnets 70*a* to 70*d* may be permanent magnets or electromagnets.

$$B_x = cy$$

$$B_y = cx \tag{11}$$

Figure 12:
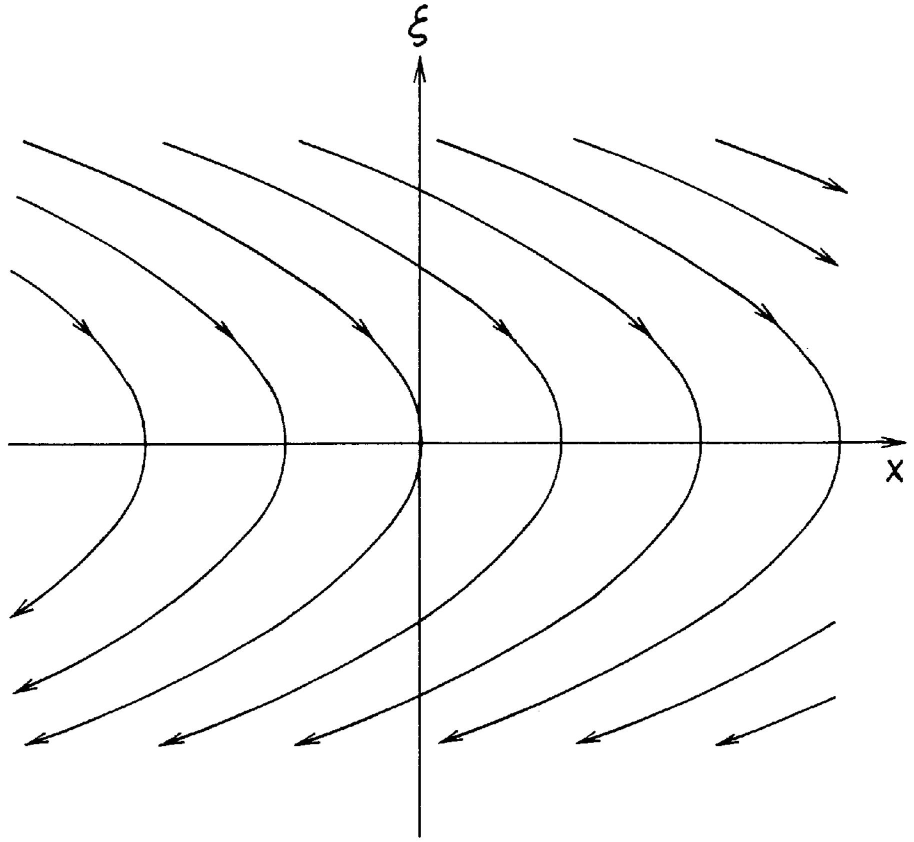
FIG. 12 is a view showing motion of neutron beams in phase space.

In this case, if $\beta = c\mu/m$, the equation of motion can be given by Eq. 12, whose solution can be obtained as shown in Eq. 13. In this case, ξ can be obtained by replacing ω with β in Eq. 5, and $x_0$ and $\xi_0$ are the initial values of x and ξ respectively. Therefore, if the sign of the right hand side of Eq. 12 is negative, the neutrons move in the direction of the arrows in FIG. 12 on a parabola as defined in Eq. 14, so that the neutron beam trajectory is bent.

$$\ddot{x} = \mp\beta \tag{12}$$

$$x = \mp\frac{\beta}{2}(t-\xi_0)^2 + x_0 \pm \frac{\beta}{2}\xi_0^2 \tag{13}$$

$$\xi = \mp t + \xi_0$$

$$\text{where } \xi = \frac{\dot{x}}{\beta}$$

$$x - x_0 = \mp\frac{\beta}{2}(\xi^2 - \xi_0^2) \tag{14}$$

Figure 13:
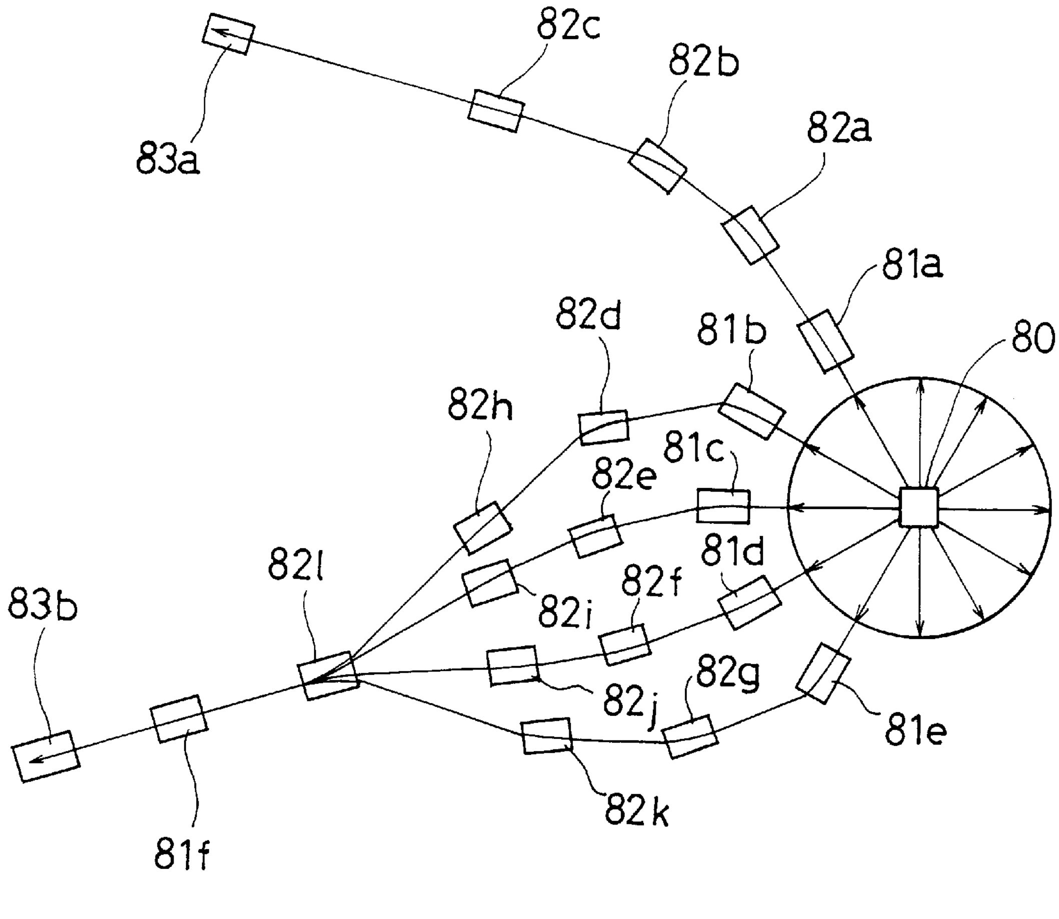
FIG. 13 is a conceptual view showing an example in which a neutron beam convergence controlling apparatus and a neutron beam trajectory curve controlling apparatus are combined.

FIG. 13 is a conceptual view showing a combination of a neutron beam convergence controlling apparatus and a neutron beam trajectory curve controlling apparatus. The apparatus of FIG. 7 can be used as the neutron beam convergence controlling apparatus, and the apparatus of FIG. 11 can be used as the neutron beam trajectory curve controlling apparatus. The neutron source 80, can be a nuclear reactor, a spallation neutron source using an accelerator, a source in which high energy neutrons emitted from radioactive isotopes are moderated by a moderator, etc. As shown by arrows, the neutrons are emitted in all directions from the surface of the moderator.

Neutrons are extracted from various directions from the neutron source 80 and focused to a thin dense beam by the neutron beam convergence apparatus 81*a* to 81*e*. Some neutrons are guided to a neutron beam utilization apparatus 83*a* through the neutron beam trajectory curve apparatus 82*a* to 82*c*. The other neutrons are combined into one beam by the neutron beam trajectory curve apparatus 82*d* to 82*l*, and pass through a neutron beam trajectory curve apparatus 82*f*, thereby further focusing them into a thinner beam so as to be guided to a neutron beam utilization apparatus 83*b*. According to such an arrangement, neutron beams with high intensity can be obtained whose beam divergence is controlled thus improving the efficiency of their use. Also, this arrangement makes it possible to investigate small samples, which was not previously carried out because of problems associated with beam intensity. Similarly, this invention makes it possible to carry out in situ measurements, which are difficult because of beam intensity problems. Moreover, polarized neutron beams having the above-explained characteristics can be generated by adiabatically connecting a local magnetic field to a flat magnetic field.

Figure 14A:
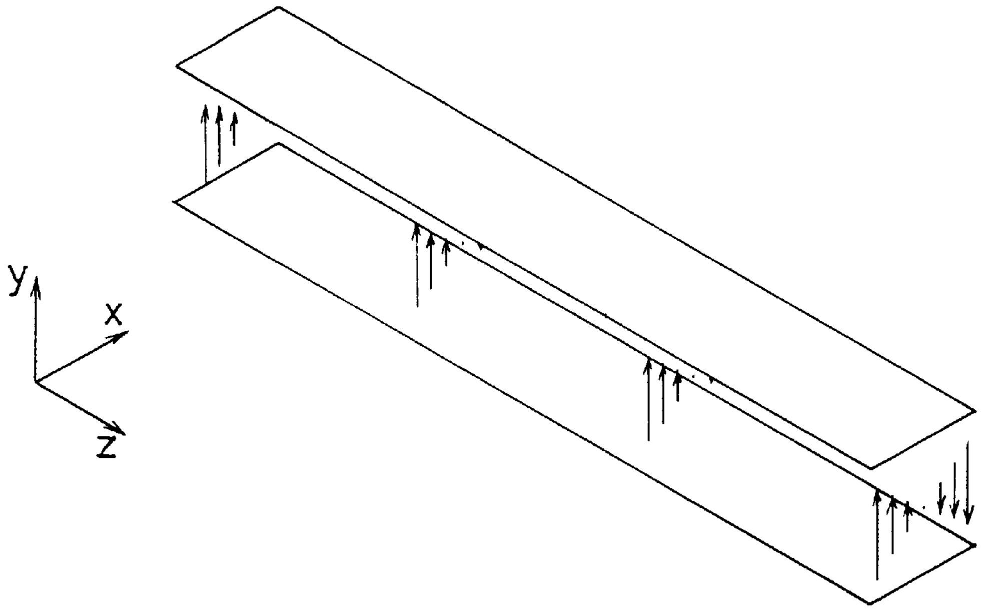
FIGS. 14A and 14B are views showing another example of the neutron beam controlling apparatus of the present invention.
Figure 14B:
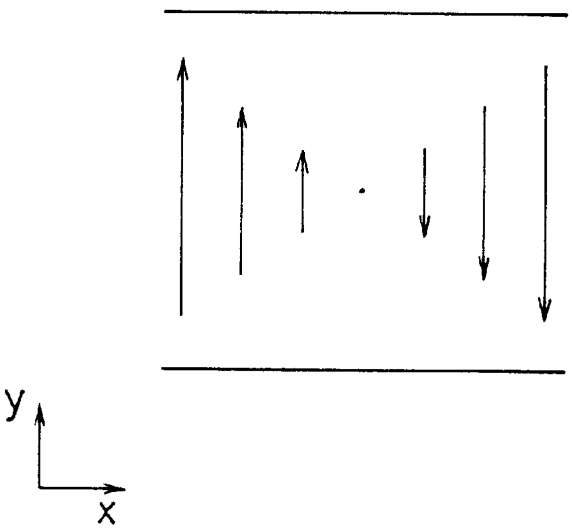

FIG. 14 is a view showing another example of the neutron beam controlling apparatus. This apparatus generates a y-direction magnetic field having a magnetic field gradient with a fixed sign in the x-direction. When neutron beams are incident along the z-axial direction of the apparatus, neutron beams having spin of the +y-direction are curved in +x-direction, and neutron beams having spin of −y-direction are curved in −x-direction. Such a transformation corresponds to the fact that a parabolic trajectory is described in phase space similar to FIG. 12 with respect to only the x-direction. Thereby, the velocity of the x-axial direction can be selectively controlled. If a neutron reflector is arranged in the ±y-directions in the same manner as the neutron guide, a device is obtained in which the curve of the beam trajectory is effective for a certain specific direction.

Figure 15A:
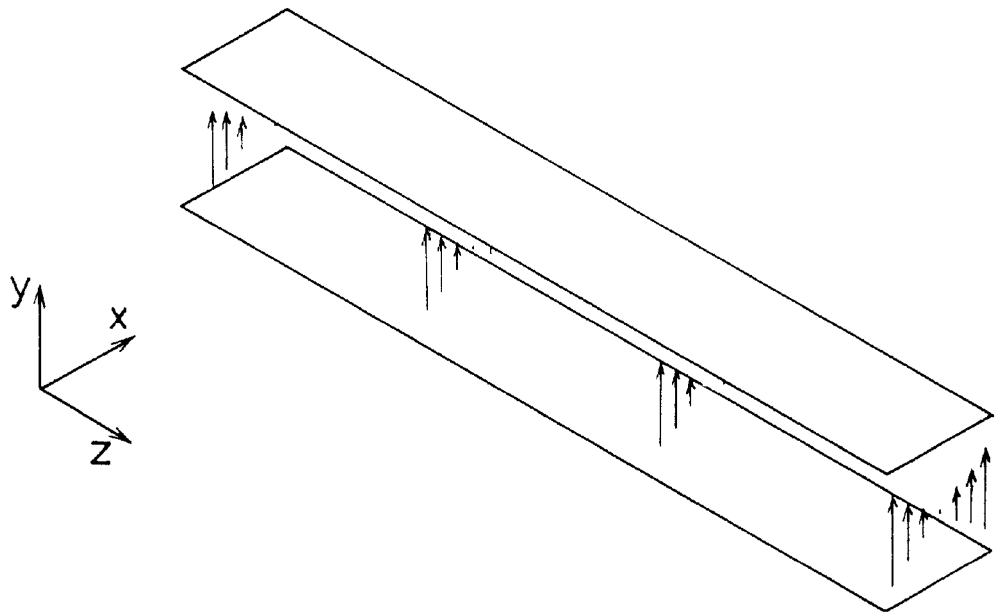
FIGS. 15A and 15B are views showing another example of the neutron beam controlling apparatus of the present invention.
Figure 15B:
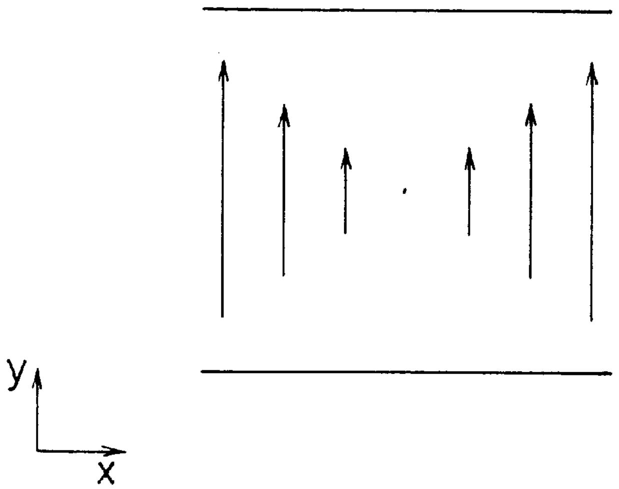

FIG. 15 is a view showing another example of the neutron beam controlling apparatus. This apparatus generates a magnetic field with an even-function-like field strength in the x-direction, and its magnetic gradient is set to be negligibly small in the y-direction. When the neutron beam is incident along the z-axis direction of the apparatus, the neutrons with spin of the +y-direction are focused into the plane of x=0, and the neutrons with spin of the −y-direction are curved in the direction going off of the plane of x=0. Such a transformation exerts the convex and concave lens effects of Eq. 7 with respect to only the x-direction. If the neutron reflectors are arranged in ±y-directions in the same manner as the neutron guide, the functions such as convergence and divergence angle control are added in the x-axial direction in addition to the normal neutron guide. Therefore, this apparatus can be used to generate thin sheet-like neutron beams by combining the convex lens, the spin flipper, and the concave lens in order.

Next, the following section explains the motion of neutron beams in multipole fields of higher order. Since a general solution can not be analytically obtained, the explanation will be given qualitatively. For simplification, the explanation is limited to a case in which the convex lens-like effect in phase space $x\ \epsilon$ is in the x-direction. The equation of motion can be described in the form of Eq. 15 where the time variable t is suitably scaled.

$$\ddot{x}=-x^n \qquad (15)$$

In this case, since the above is limited to the convex lens-like case, n is limited to an odd number. The case of n=1 corresponds to the sextupole magnetic field.

Figure 16A:
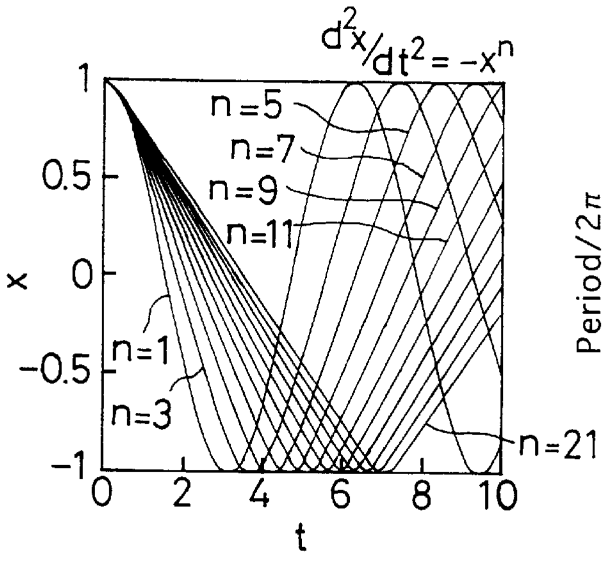
FIGS. 16A and 16C are views qualitatively explaining the motion of neutrons in a multipole field of higher order.
Figure 16B:
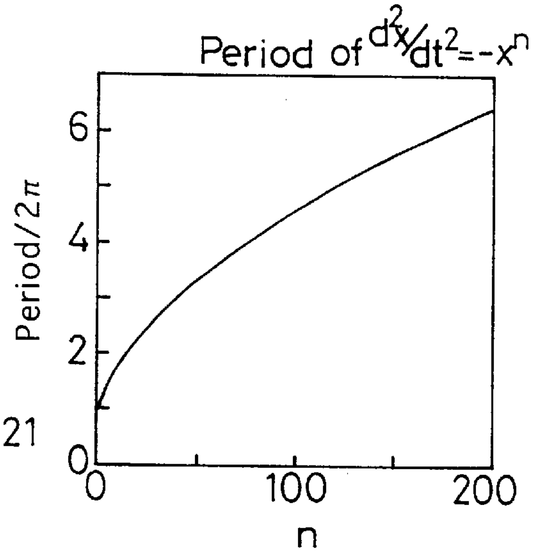
Figure 16C:
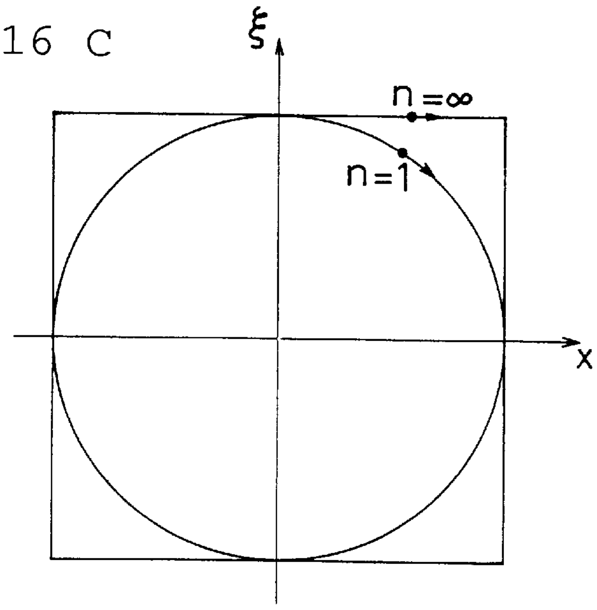
Figure 17A:
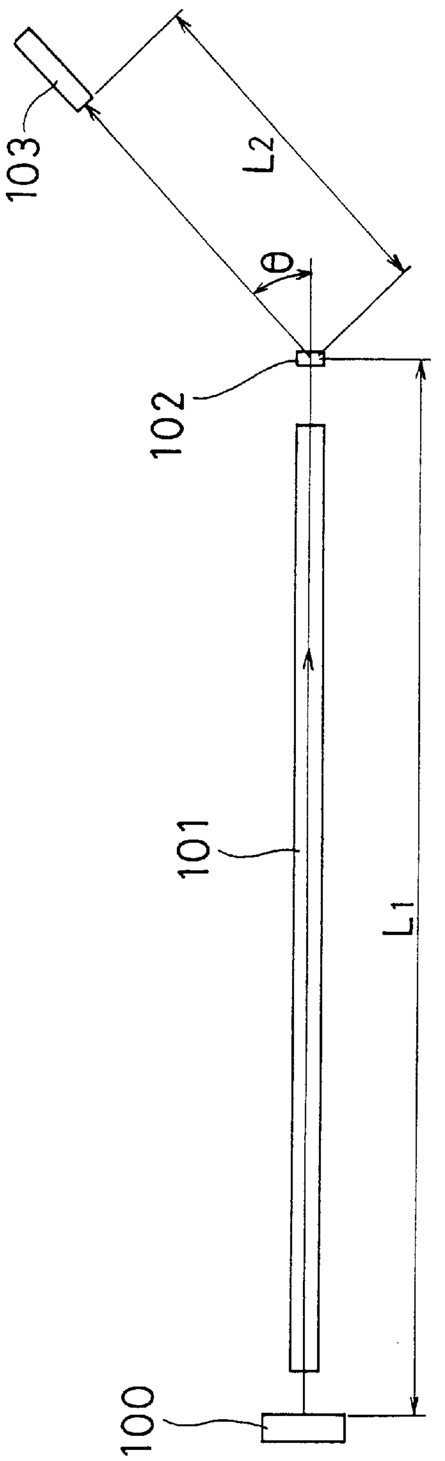
FIGS. 17A and 17B are conceptional views of a conventional analyzer for analyzing the structure of material by neutron scattering.
Figure 17B:
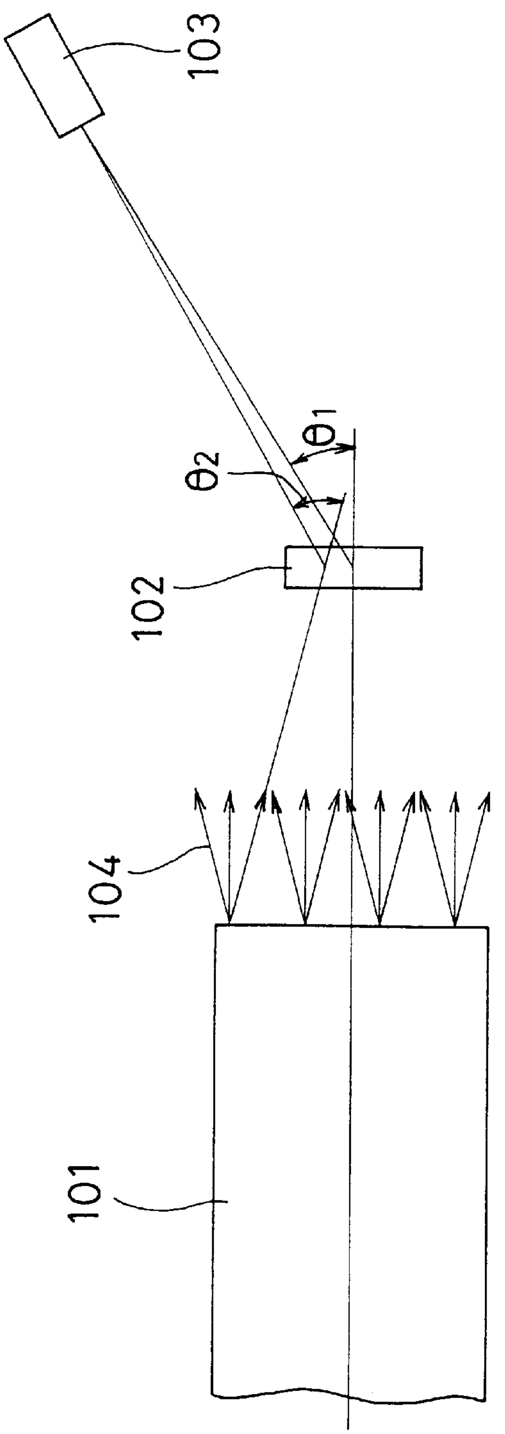
Figure 18:
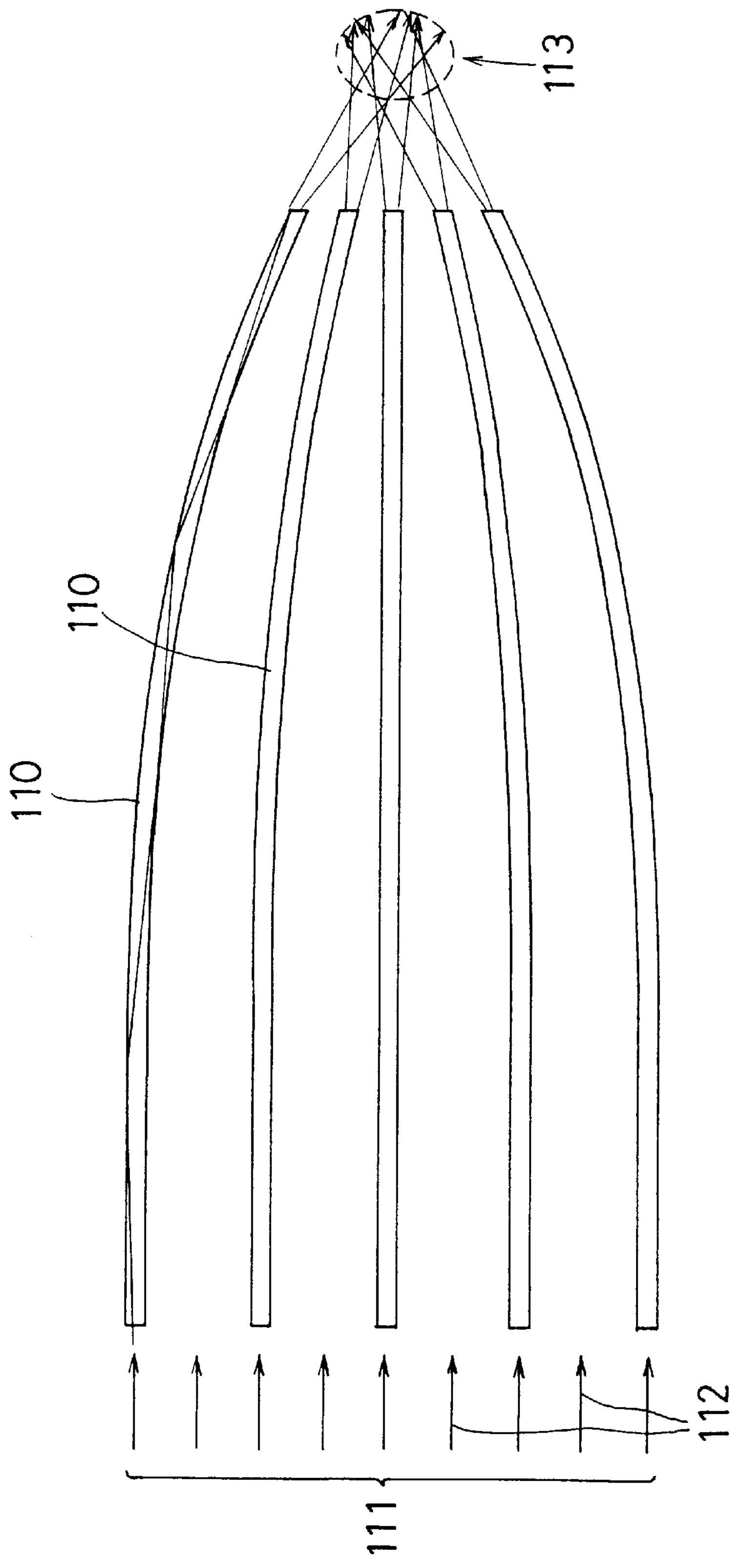
FIG. 18 is a view explaining a method for improving neutron intensity by use of a capillary guide.

FIGS. 16A to 16C are views qualitatively explaining the motion of neutron beams in multipole fields of higher order. FIG. 16A shows the numerically calculated evolution of the position. The solution of Eq. 15 is a periodic solution as long as n is an odd number. FIG. 16B shows dependence of the period on n, which shows that the period of the scaled time variable becomes longer with increasing n. FIG. 16C shows schematically the trajectory of the beam in phase space with respect to each n. In the case of n=1, that is a sextupole magnetic field, uniform motion is performed on a circle around the origin. When n=∞, motion is performed on a square, which is circumscribed with the circle of n=1. Although uniform motion is performed on a side parallel to the x-axis at a finite velocity, the motion is performed on a side parallel to the ξ-axis at infinite velocity. This is the same function as the neutron guide. In the case of n>1, an intermediate motion is performed. The fact that n is larger means the velocity of motion parallel to the ξ-axis increases as x comes off o. In other words, the influence of the magnetic field can be selectively exerted on the portion where x comes off o. This can be applied to a case in which the central beam portion has a relatively desirable beam characteristic but the peripheral portion is in a state in which control should be provided. Through this approach not only can simple-beam curving and beam convergence be provided but also control is given to a specific portion of the beam, allowing optimization of the thinner beam.

In the case where n is an even number, the beams are curved, so that their directions are changed. However, the amount of curvature differs, depending on the energy of the neutrons. In other words, faster neutrons pass through the magnetic field without being largely curved, and slower neutrons are largely curved. Therefore, the use of this property allows measurements of neutron velocity, that is, energy measurements. For example, this property can be applied to the following case. When neutrons give energy to the sample due to scattering (that is inelastic scattering occurs) the given energy can be measured, and the neutrons are in an energy region lower than a thermal energy region. The only method available to detect such neutrons is to transform them to charged particles to the degree of MeV by nuclear reaction and detection thereafter. Therefore, as soon as the neutrons are detected, the neutrons are lost. Neutron energy can be measured by a flight time method. However, since the neutrons are lost at detection, the application of the flight time method is limited to the case in which neutron generation time is clearly defined. However, since scattering times cannot be generally specified, the flight time method is not generally used to measure neutron energy after inelastic scattering. Although this problem can be avoided by use of neutron diffraction, neutrons which can satisfy diffraction conditions, must be selectively measured, thus resulting in lower efficiency. A non-destructive method of measuring the neutron velocity by curving the trajectory with a magnetic field can extend the possibility of inelastic scattering experiments.

EFFECT OF THE INVENTION

According to the present invention, the distribution shape of neutron beams, and velocity can be freely controlled. Neutron beams having high beam intensity and small beam divergence or sheet-like neutron beams can be produced according to the present invention. Also, the present invention can be used to obtain polarized neutron beams and to measure their polarization.

What is claimed is:

1. A method for controlling a neutron beam comprising: passing the neutron beam through a magnetic field having a field gradient in a direction normal to a central axis of the neutron beam, so as to change the distribution of the neutron beam in a phase space to a desired distribution.

2. The method according to claim 1, wherein the neutron beams are rotated in the phase space so as to interchange a beam position and a beam dispersion in a real space.

3. The method according to claim 1, wherein rotation and expansion and contraction are combined in the phase space so as to reduce the size of the neutron beam in the phase space.

4. The method according to claim 1, wherein rotation and expansion and contraction are combined in the phase space so as to reduce the size of the neutron beam in the phase space, thereby obtaining a thin neutron beam having small divergence in the real space.

5. The method according to claim 3, wherein the method comprises a step of rotating the neutron beam in the phase space, a step of reversing the relationship between beam spin and a local magnetic field, and a step of compressing the neutron beam along its longitudinal direction of the neutron beam in the phase space.

6. The method according to any one of claims 1–5 or 15, wherein strength of the gradient magnetic field increases as coming off a beam central axis.

7. The method according to any one of claims 1–5 or 15, wherein the gradient magnetic field is a sextupole magnetic field.

8. The method according to claim 1, wherein the gradient magnetic field is a gradient magnetic field having a field gradient with a fixed sign along a direction normal to the beam central axis.

9. The method according to any one of claims 1–5 or 8, wherein a polarized neutron beam is obtained.

10. A neutron beam controlling apparatus comprising:

a first generator of inhomogeneous magnetic field;

a spin flipper for reversing spin of neutron beam emitted from the generator; and a second generator of inhomogeneous magnetic field to which the neutron beam is incident through the spin flipper, wherein the first generator has a function of rotating the neutron beam in a phase space and focusing in a real space, and the second generator has a function of compressing the neutron beam along in its longer side in the phase space so as to change the neutron beam to a parallel beam in the real space.

11. A neutron beam controlling apparatus comprising a generator of an inhomogeneous magnetic field for rotating the neutron beam in a phase space so as to interchange a beam position and a beam shape in a real space.

12. The apparatus according to claim 10, or 11, wherein the generator is a sextupole magnetic field generator.

13. A neutron beam controlling apparatus comprising a generator of an inhomogeneous magnetic field whose gradient has a fixed sign along a direction normal to the beam axis and the generator having a function of bending the neutron trajectory.

14. The method according to claim 4, wherein the method comprises a step of rotating the neutron beam in the phase space, a step of reversing the relationship between beam spin and a local magnetic field, and a step of compressing the neutron beam along its longitudinal direction of the neutron beam in the phase space.

15. The method according to claim 6, wherein a polarized neutron beam is obtained.

16. The method according to claim 7, wherein a polarized neutron beam is obtained.

* * * * *